United States Patent [19]

Mishra et al.

[11] Patent Number: 5,264,140

[45] Date of Patent: Nov. 23, 1993

[54] ANTIOXIDANT-DISPERSANT VI IMPROVER ADDITIVE AND LUBRICATING OIL COMPOSITION CONTAINING SAME

[75] Inventors: Munmaya K. Mishra; Isaac D. Rubin, both of Wappingers Falls, N.Y.

[73] Assignee: Texaco Inc., White Plains, N.Y.

[21] Appl. No.: 891,131

[22] Filed: Jun. 1, 1992

[51] Int. Cl.$^5$ .................................... C10M 149/14
[52] U.S. Cl. ...................... 252/51.5 A; 252/51.5 R; 252/43; 252/52 R; 525/285; 525/322; 525/324
[58] Field of Search ............. 252/51.5 A, 51.5 R, 252/52 R, 43, 34; 525/285, 322, 324

[56] References Cited

U.S. PATENT DOCUMENTS

| | | | |
|---|---|---|---|
| 2,402,792 | 6/1946 | Watson | 252/51.5 A |
| 2,625,511 | 1/1953 | Rocchini | 252/47.5 |
| 4,089,794 | 5/1978 | Engel et al. | 252/56 D |
| 4,137,185 | 1/1979 | Gardiner et al. | 252/33 |
| 4,141,847 | 2/1979 | Kiovsks | 252/51.5 A |
| 4,144,181 | 3/1979 | Elliott et al. | 252/33 |
| 4,693,838 | 9/1987 | Varma et al. | 252/51.5 A |
| 4,735,736 | 4/1988 | Chung | 252/51.5 A |
| 4,780,228 | 10/1988 | Gardiner et al. | 252/51 |
| 4,863,623 | 9/1989 | Nalesnik | 252/51.5 A |
| 5,013,469 | 5/1991 | DeRosa et al. | 252/51.5 A |
| 5,049,294 | 9/1991 | Van Zon et al. | 252/51.5 A |

OTHER PUBLICATIONS

Odian, *Principles of Polymerization,* 2nd Ed., John Wiley and Sons, N.Y., pp. 373–374, (1981).

*Primary Examiner*—Prince Willis, Jr.
*Assistant Examiner*—Alan D. Diamond
*Attorney, Agent, or Firm*—James J. O'Loughlin; Vincent A. Mallare

[57] ABSTRACT

A lubricating oil composition comprising:
(a) a major amount of a base oil having a lubricant viscosity; and
(b) a minor amount of, as an antioxidant/dispersant VI improver additive, a lubricant additive.

14 Claims, No Drawings

ANTIOXIDANT-DISPERSANT VI IMPROVER ADDITIVE AND LUBRICATING OIL COMPOSITION CONTAINING SAME

BACKGROUND OF THE INVENTION

This invention relates to lubricating oil compositions, and more particularly to an additive which acts as an antioxidant/dispersant, VI improver when employed in a lubricating oil composition.

There have been many additives developed and prepared for imparting various properties to lubricating oil compositions. However, these additives generally are used for only one need, such as dispersancy, antioxidancy, VI improvement, antiwear and the like.

Thus, it is an object of the present invention to provide a cost effective additive which imparts at least antioxidancy/dispersancy and VI improvement properties to lubricating oil compositions.

DISCLOSURE STATEMENT

U.S. Pat. No. 4,089,794 discloses ethylene copolymers derived from ethylene and one or more $C_3$-$C_{20}$ alpha-olefins grafted with an ethylenically unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,144,181 discloses polymer additives for fuels and lubricants comprising a grafted ethylene copolymer reacted with a polyamine, polyol or hydroxyamine and finally reacted with an alkaryl sulfonic acid.

U.S. patent application Ser. No. 07/739,547 discloses derivatized graft copolymer compositions comprising an ethylene alpha-monoolefin copolymer comprising about 15 to about 80 mole % ethylene, about 20 to about 85 mole % of at least one $C_3$-$C_{10}$ alpha-monoolefin and, optionally, 0 to about 15 mole % of a polyene selected from non-conjugated dienes and trienes and having an average molecular weight ranging from about 5,000 to about 500,000; grafted with at least one ethylenically unsaturated carboxylic acid material; and derivatized with a heterocyclic compound of the following general formula

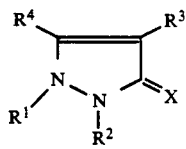

where $R^1$ is hydrogen, aryl, or a branched or straight chain $C_1$-$C_{20}$ alkyl, alkaryl, alkoxyl, alkenyl, hydroxyalkyl, or amino alkyl; $R^2$ is hydrogen, aryl, or a branched or straight chain $C_1$-$C_{20}$ alkyl, alkaryl, alkoxyl, alkenyl, hydroxyalkyl, or amino alkyl; at least one of $R^3$ and $R^4$ is $NH_2$, $CH_2$—$(CH_2)_n$—$NH_2$, or $CH_2$—aryl—$NH_2$ in which n has a value from 0 to 10, the other $R^3$ and $R^4$, if either, is hydrogen, aryl, or a branched or straight chain ($C_1$-$C_{20}$) alkyl, alkaryl, alkoxyl, alkenyl, hydroxyalkyl, or amino-alkyl; and where X is oxygen, sulfur, or nitrogen.

The disclosures in the foregoing patents and patent application which relate to VI improvers and dispersants for lubricating oils namely U.S. Pat. Nos. 4,089,794, 4,137,185 and 1,144,181; and U.S. patent application Ser. No. 07/739,547 are incorporated herein by reference.

SUMMARY OF THE INVENTION

The present invention provides a lubricating oil composition comprising:

(a) a major amount of a base oil having a lubricant viscosity; and (b) a minor amount of, as an antioxidant/dispersant VI improver additive, a lubricant additive.

DETAILED DESCRIPTION OF THE INVENTION

The polymer or copolymer substrate employed in the lubricating oil additive of the present invention may be prepared from ethylene and propylene or it may be prepared from ethylene and a higher olefin. More complex polymer substrates may be prepared using a third component. The polymerization reaction to form the above polymer substrate is generally carried out in the presence of a Ziegler-Natta catalyst in a hydrocarbon solvent. The polymer substrate, that is an ethylene copolymer or a terpolymer, is an oil-soluble, substantially linear, rubbery material having an average molecular weight ranging from about 1000 to about 1,000,000 with a preferred number average molecular weight ranging from about 25,000 to about 250,000 and a most preferred number average molecular weight ranging from about 50,000 to about 150,000.

Substrates may also be prepared by polymerizing or copolymerizing butadiene and isoprene with each other or some styrene using an alkyl lithium or other ionic catalyst and hydrogenating the product. If desired, prior to catalyst removal, the living polymer chains can be reacted with divinylbenzene or other difunctional or multifunctional hubs to yield star-type (branched) polymer backbones for hydrogenation and further grafting.

An ethylenically unsaturated carboxylic acid material is next grafted onto the described polymer backbone. The preferred compound, maleic anhydride, was grafted onto the polymer backbone by free-radical method. Polymer substrates are available commercially. Particularly useful are those containing from about 20 to about 80 mole percent ethylene units, about 80 to about 20 mole percent propylene units. Maleic anhydride grafted polyisobutylene may also be used.

The polymer intermediate possessing carboxylic acid acylating functions is reacted with an amino aromatic compound of the following general formula

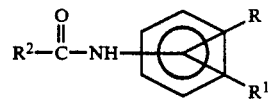

wherein R is $NH_2$, $CH_2$—aryl—$NH_2$ or $CH_2$—$(CH_2)_n$—$NH_2$ in which n is an integer of 1 to 10; $R^1$ and $R^2$ are each hydrogen, alkyl, alkenyl, alkoxyl, aralkyl, alkaryl, hydroxyalkyl, aminoalkyl, phenyl or naphthyl.

Preferably, the amino aromatic compound is 3'-amino-4'- methoxy acetanilide which is represented by the formula

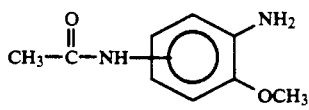

More complex polymer substrates, often designated as interpolymers, may be prepared using a third component. The third component generally used to prepare an interpolymer substrate is a polyene monomer selected from non-conjugated dienes and trienes. The non-conjugated diene component is one having from about 5 to about 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norbornene, 1,5-heptadiene, and 1,6-octadiene. A mixture of more that one diene can be used in the preparation of the interpolymer. A preferred non-conjugated diene for preparing a terpolymer or interpolymer substrate is 1,4-hexadiene.

The triene component will have at least two non-conjugated double bonds and up to about 30 carbon atoms in the chain. Typical trienes useful in preparing the interpolymer of the invention are 1-isopropylidene-3a,4,7,7a-tetrahydroindene, 1-isopropylidenedicyclopentadiene, dehydro-isodicyclopentadiene, and 2-(2-methylene-4-methyl-3-pentenyl)[2.2.1]bicyclo-5-heptene.

The polymerization reaction to form the polymer substrate is generally carried out in the presence of a catalyst in a solvent medium. The polymerization solvent may be any suitable inert organic solvent that is liquid under reaction conditions for solution polymerization of monoolefins, which is generally conducted in the presence of a Ziegler-Natta type catalyst. Examples of satisfactory hydrocarbon solvents include straight chain paraffins having from about 5-8 carbon atoms, with hexane being preferred. Aromatic hydrocarbons, preferably aromatic hydrocarbons having a single benzene nucleus, such as benzene, toluene and the like, and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler-Natta polymerization reaction.

In a typical preparation of a polymer substrate, hexane is first introduced into a reactor and the temperature in the reactor is raised moderately to about 30° C. Dry propylene is fed to the reactor until the pressure reaches about 40-45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha monoolefin copolymers may consist of from about 15 to about 80 mole % ethylene and from about 20 to about 85 mole % propylene or higher monoolefin, with the preferred mole ratios being from about 30 to about 80 mole % ethylene and from about 20 to about 70 mole % of at least one $C_3$ to $C_{10}$ alpha monoolefin, and with the most preferred proportions being from about 50 to about 80 mole % ethylene and 20 to about 50 mole % propylene.

Terpolymer variations of the foregoing polymers may contain up to about 15 mole % of a non-conjugated diene or triene.

The above polymer substrate, that is the ethylene copolymer or terpolymer is an oil-soluble, substantially linear, rubbery material having a number average molecular weight from about 5,000 to about 500,000 with a preferred molecular weight range of about 25,000 to about 250,000 and a most preferred range from about 50,000 to about 150,000.

The terms polymer and copolymer are used generically to encompass ethylene and/or higher alpha monoolefin polymers, copolymers, terpolymers or interpolymers. These materials may contain minor amounts of other olefinic monomers so long as their basic characteristics are not materially changed.

The above polymer substrate of the present invention is essentially a saturated hydrocarbon polymer or copolymer containing only minor amounts of double bonds, if any, prepared using Ziegler-Natta or ionic catalysts and having average molecular weights ranging from about 5,000 to about 500,000.

Other substrates can be made through ionic polymerization or copolymerization of isoprene, butadiene and other conjugated dienes and copolymerization of the above with each other in hydrocarbon solvents, followed by hydrogenation to liminate most or all of the aliphatic unsaturation. Alkyl lithium derivatives are suitable catalysts, an example being butyl lithium. Alternatively, the living polymer/copolymer chains prior to catalyst removal can be reacted further with divinylbenzene or other difunctional monomers or oligomers of these materials to create star polymers, which are hydrogenated as above. To be useful substrates for this invention, these linear or star polymers or branched copolymers can range in average molecular weight from about 10,000 to about 500,000 with the number of arms on the star polymers being between 3 and 25.

An ethylenically unsaturated carboxylic acid material is next grafted onto the above described polymer backbones. These materials which are attached to the polymer contain at least one ethylenic bond and at least one, preferably two, carboxylic acid (or its anhydride) groups or a polar group which is convertible into said carboxyl groups by oxidation or hydrolysis. Maleic anhydride or a derivative thereof is preferred. It grafts onto the backbone to give two carboxylic acid functionalities. Examples of additional unsaturated carboxylic materials include chlormaleic anhydride, itaconic anhydride, or the corresponding dicarboxylic acids, such as maleic acid, fumaric acid and their monoesters.

The ethylenically unsaturated carboxylic acid material may be grafted onto the polymer in a number of ways. It may be grafted onto the polymer by a thermal process known as the "ene" process or by grafting in solution or in solid form using a radical initiator. The free-radical induced grafting of ethylenically unsaturated carboxylic acid materials in solvents, such as benzene is a preferred method. It is carried out at an elevated temperature in the range of about 100° C. to about 250° C., preferably 120° C. to about 190° C., and more preferably at 150° C. to about 180° C., e.g., above 160° C., in a solvent, preferably a mineral lubricating oil solution containing, e.g., 1 to about 50 wt. %, preferably 5 to about 30 wt. %, based on the initial total oil solution, of the backbone polymer and preferably under an inert environment.

The free-radical initiators which may be used are peroxides, hydroperoxides, and azo compounds and preferably those which have a boiling point greater than about 100° C. and which decompose thermally within the grafting temperature range to provide free radicals. Representative of these free-radical initiators are azobisisobutyronitrile and 2,5-dimethyl-hex-3-yne-2,5 bis-tertiary-butyl peroxide. The initiator is used in an amount of between about 0.005% and about 1% by weight based on the weight of the reaction mixture solution. The grafting is preferably carried out in an inert atmosphere, such as under nitrogen blanketing. The resulting polymer intermediate is characterized by having carboxylic acid acylating functions within its structure.

In the solid or melt process for forming a graft polymer, the unsaturated carboxylic acid with the optional use of a radical initiator is grafted onto molten rubber using rubber masticating or shearing equipment. The temperature of the molten material in this process may range from about 150° C.–400° C.

According to the present invention, a particularly preferred amino aromatic compound is 3'amino-4'methoxy acetanilide represented by the formula

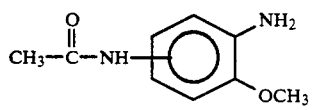

The reaction between the polymer substrate intermediate having grafted thereon carboxylic acid acylating function and the heterocyclic compound is conducted by heating a solution of the polymer substrate under inert conditions and then adding the heterocyclic compound to the heated solution, generally with mixing, to effect the reaction. It is convenient to employ an oil solution of the polymer substrate heated to about 140° C. to about 175° C. while maintaining the solution under a nitrogen blanket. The heterocyclic compound is added to this solution and the reaction is effected under the noted conditions.

The following Example is provided to illustrate the advantages and effectiveness of the present invention.

EXAMPLE I 30 grams of solid maleic anhydride graft polymer (rubber) in which the polymer substrate consisted of about 60 mole percent ethylene and 40 mole percent propylene having an average molecular weight of 100,000 on which has been grafted 0.8 weight percent of maleic anhydride was dissolved in 191 grams of solvent neutral oil at 160° C. with mechanical stirring while the mixture was maintained under a nitrogen blanket. After the rubber polymer had dissolved, mixing was continued for an additional hour at 160° C. 0.8 gram of neat 3'-amino-4'- methoxy acetanilide (90%) followed by 9 grams of a low molecular weight ethylene oxide polymer (such as surfonic L-24-7 made by Texaco Chemical Company of Houston, Tex.) was added to the oil solution of the polymer and a reaction effected over 3 hours at 160° C. under nitrogen. The reaction mixture containing the derivatized graft polymer was then cooled and filtered. FTIR showed quantitative conversion.

The graft and derivatized polymers of the present invention as described above, are useful as additives for lubricating oils. They are multi-functional additives for lubricants being effective in providing dispersancy, viscosity index improvement, and anti-oxidant properties to lubricating oils. They can be employed in a variety of oils of lubricating viscosity including natural and synthetic lubricating oils and mixtures thereof.

The dispersant properties of the additive-containing oil were determined in a Bench VE Dispersancy Test (BVET). The dispersancy of a lubricating oil was determined relative to two references which are the original ethylene-propylene backbone (EPM) and EPM grafted with maleic anhydride (EPSA). The additive reaction product was employed in the oil at a concentration of 1.25 weight percent polymer solution. The numerical value of the test results decreases with an increase in effectiveness as shown below in Table I.

TABLE I

| BENCH VE DISPERSANCY TEST | |
|---|---|
| Additive | Result |
| Example I | 68 |
| Maleic anhydride grafted (EPSA) | 190 |
| Ethylene-Propylene Copolymer (EPM) | 200 |

The anti-oxidant properties of the present reaction product, i.e., additive, in a lubricating oil were determined in a Bench Oxidation Test. In this test, 1.5 weight percent of the additive reaction product was blended into solvent neutral oil. The mixture was continuously stirred while being heated accompanied by bubbling with air. Samples were withdrawn periodically for analysis. Differential Infrared Absorption (DIR) was used to observe changes in the intensity of the carboxyl vibration band intensity at 1710 cm$^{-1}$. A lower number indicates higher thermal-oxidative stability of the sample. The results of the test are shown below in Table II.

TABLE II

| BENCH OXIDATION TEST | |
|---|---|
| Additive | Result |
| Example I | 4.3 |
| Maleic anhydride grafted (EPSA) | 15.0 |

We claim:
1. A lubricating oil composition comprising:
   a) a major amount of a base oil having a lubricant viscosity; and
   b) a minor amount of, as an antioxidant/dispersant anti-wear VI improver lubricant additive, said additive comprising:
      (i) an essentially saturated hydrocarbon polymer or copolymer containing only minor amounts of double bonds, prepared using ionic catalysts and having a number average molecular weight ranging from about 5,000 to about 500,000;
      (ii) at least one ethylenically unsaturated carboxylic acid material grafted onto said polymer or copolymer; and
      (iii) an amino aromatic compound which is reacted with the carboxylic acid groups of the carboxylic acid material-grafted copolymer and is represented by the formula

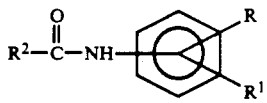

wherein R is $NH_2$, $CH_2$—aryl—$NH_2$ or $CH_2$—$(CH_2)_n$—$NH_2$ in which n is an integer of 1 to 10; and $R^1$ and $R^2$ are each hydrogen, alkyl, alkenyl, alkoxyl, aralkyl, alkaryl, hydroxyalkyl, aminoalkyl, phenyl or naphthyl.

2. The lubricating composition of claim 1, wherein said amino aromatic compound is 3'-amino-4'-methoxy acetanilide represented by the formula

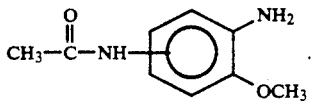

3. The lubricating composition of claim 1 wherein the polymer is a hydrogenated linear polymer or copolymer of butadiene, isoprene, their mixtures or their mixtures with styrene.

4. The lubricating oil composition of claim 1, wherein said copolymer has a number average molecular weight ranging from about 25,000 to about 250,000.

5. The lubricating oil composition of claim 1, wherein said polymer is a star polymer.

6. The lubricating oil composition of claim 1 wherein the polymer is a star polymer with hubs of divinylbenzene and arms of hydrogenated chains of isoprene, butadiene or their copolymers with each other or styrene.

7. The lubricating oil composition according to claim 1 wherein the ethylenically unsaturated carboxylic acid material is maleic anhydride.

8. The lubricating oil composition of claim 1 wherein the polymerization catalyst is butyl lithium.

9. A lubricating oil composition comprising:
a) a major amount of a base oil having a lubricant viscosity; and
b) a minor amount of as an antioxidant dispersant VI improver lubricant additive, said additive comprising:
(i) an ethylene alpha-monoolefin copolymer comprising about 15 to about 80 mole % ethylene, about 20 to about 85 mole % of at least one ($C_3$-$C_{10}$) alpha-monoolefin and, optionally, 0 to about 15 mole % of a polyene selected from non-conjugated dienes and trienes and having a number average molecular weight ranging from about 5,000 to about 500,000;
(ii) at least one ethylenically unsaturated carboxylic acid material grafted onto said copolymer; and
(iii) an amino aromatic compound which is reacted with the carboxylic acid groups of the carboxylic acid material-grafted copolymer and represented by the formula

wherein R is $NH_2$, $CH_2$—aryl—$NH_2$ or $CH_2$ $(CH_2)_n$—$NH_2$ in which n is an integer of 1 to 10; and $R^1$ and $R^2$ are each hydrogen, alkyl, alkenyl, alkoxyl, aralkyl, alkaryl, hydroxyalkyl, aminoalkyl, phenyl or naphthyl.

10. The lubricating oil composition of claim 9 wherein said amino aromatic compound is 3'-amino-4'-methoxy acetanilide represented by the formula

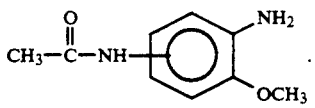

11. The lubricating oil composition of claim 9, wherein said copolymer has a number average molecular weight ranging from about 25,000 to about 250,000.

12. The lubricating oil composition of claim 9, wherein said copolymer has a number average molecular weight ranging from about 50,000 to about 150,000.

13. The lubricating oil composition of claim 9, wherein the ethylenically unsaturated carboxylic acid material is maleic anhydride.

14. The lubricating oil composition according to claim 9, wherein the ethylene alpha-monoolefin copolymer comprises about 50 to about 80 mole % ethylene, about 20 to about 50 mole % of at least one ($C_3$-$C_{10}$) alpha-monoolefin and, optionally, 0 to about 15 mole percent of a polyene selected from non-conjugated dienes and trienes.

* * * * *